(12) United States Patent
Eguchi et al.

(10) Patent No.: US 8,043,148 B2
(45) Date of Patent: Oct. 25, 2011

(54) NOISE SUPPRESSING DAMPER

(75) Inventors: Tsuyoshi Eguchi, Hyogo (JP); Atsushi Suzuki, Aichi (JP); Tetsuo Tominaga, Hyogo (JP); Mitsuhiro Nakao, Hyogo (JP); Hajime Izumi, Hyogo (JP); Jun Ito, Aichi (JP); Satoshi Kominami, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 687 days.

(21) Appl. No.: 11/989,999

(22) PCT Filed: Jan. 16, 2008

(86) PCT No.: PCT/JP2008/050382
§ 371 (c)(1),
(2), (4) Date: Feb. 5, 2008

(87) PCT Pub. No.: WO2008/090781
PCT Pub. Date: Jul. 31, 2008

(65) Prior Publication Data
US 2010/0139308 A1 Jun. 10, 2010

(30) Foreign Application Priority Data

Jan. 26, 2007 (JP) ................................. 2007-016341

(51) Int. Cl.
*F24F 13/14* (2006.01)
*F24F 13/10* (2006.01)
*F24F 13/04* (2006.01)
(52) U.S. Cl. ........................................ 454/262; 454/333
(58) Field of Classification Search .................. 454/262, 454/333, 906
See application file for complete search history.

(56) References Cited

U.S. PATENT DOCUMENTS

| 2,644,389 | A | * | 7/1953 | Dauphinee | 454/323 |
| 4,688,472 | A | * | 8/1987 | Inglis | 454/333 |
| 4,766,807 | A | * | 8/1988 | Davis | 454/333 |
| 6,047,951 | A | * | 4/2000 | Ito et al. | 251/308 |

(Continued)

FOREIGN PATENT DOCUMENTS

EP     1 580 049 A1     9/2005

(Continued)

OTHER PUBLICATIONS

ASHRAE Handbook—Heating, Ventilating, and Air-Conditioning Applications (I-P Edition), 2007, section 47.10.*

(Continued)

*Primary Examiner* — Steven B McAllister
*Assistant Examiner* — Phillip E Decker
(74) *Attorney, Agent, or Firm* — Westerman, Hattori, Daniels & Adrian, LLP

(57) ABSTRACT

A damper is provided to suppress the abnormal noise or air noise at the small opening of the damper. The damper includes a wall surface which forms an air flow passage, a stationary portion which extends from the wall surface to the center of a flow passage, and a rotating portion rotatably disposed in the flow passage, having one end in contact with a portion of the stationary portion at a downstream side of an air flow through the flow passage. A curved wall portion as a convex curved surface protruding to the center of the flow passage is formed on a position of the wall surface on which the air flow passing between the one end and the stationary portion impinges.

3 Claims, 8 Drawing Sheets

U.S. PATENT DOCUMENTS

| | | | |
|---|---|---|---|
| 6,135,418 A * | 10/2000 | Hatton | 251/306 |
| 6,412,755 B2 * | 7/2002 | Ito | 251/173 |
| 6,872,348 B2 * | 3/2005 | Yasuno et al. | 264/274 |
| 7,520,803 B2 * | 4/2009 | Ito et al. | 454/121 |
| 2004/0038639 A1 | 2/2004 | Yasuno et al. | |
| 2006/0057951 A1 * | 3/2006 | Jung | 454/143 |
| 2006/0252362 A1 * | 11/2006 | Ito et al. | 454/156 |

FOREIGN PATENT DOCUMENTS

| | | | |
|---|---|---|---|
| EP | 1 630 486 A2 | | 3/2006 |
| JP | 11301240 A | * | 11/1999 |
| JP | 2005-205990 A | | 8/2005 |
| JP | 2006-69489 A | | 3/2006 |
| JP | 2006-182245 A | | 7/2006 |
| JP | 2006224881 A | * | 8/2006 |

OTHER PUBLICATIONS

Supplementary European Search Report dated Oct. 4, 2010, issued in corresponding European Patent Application No. 08710549.0.

* cited by examiner

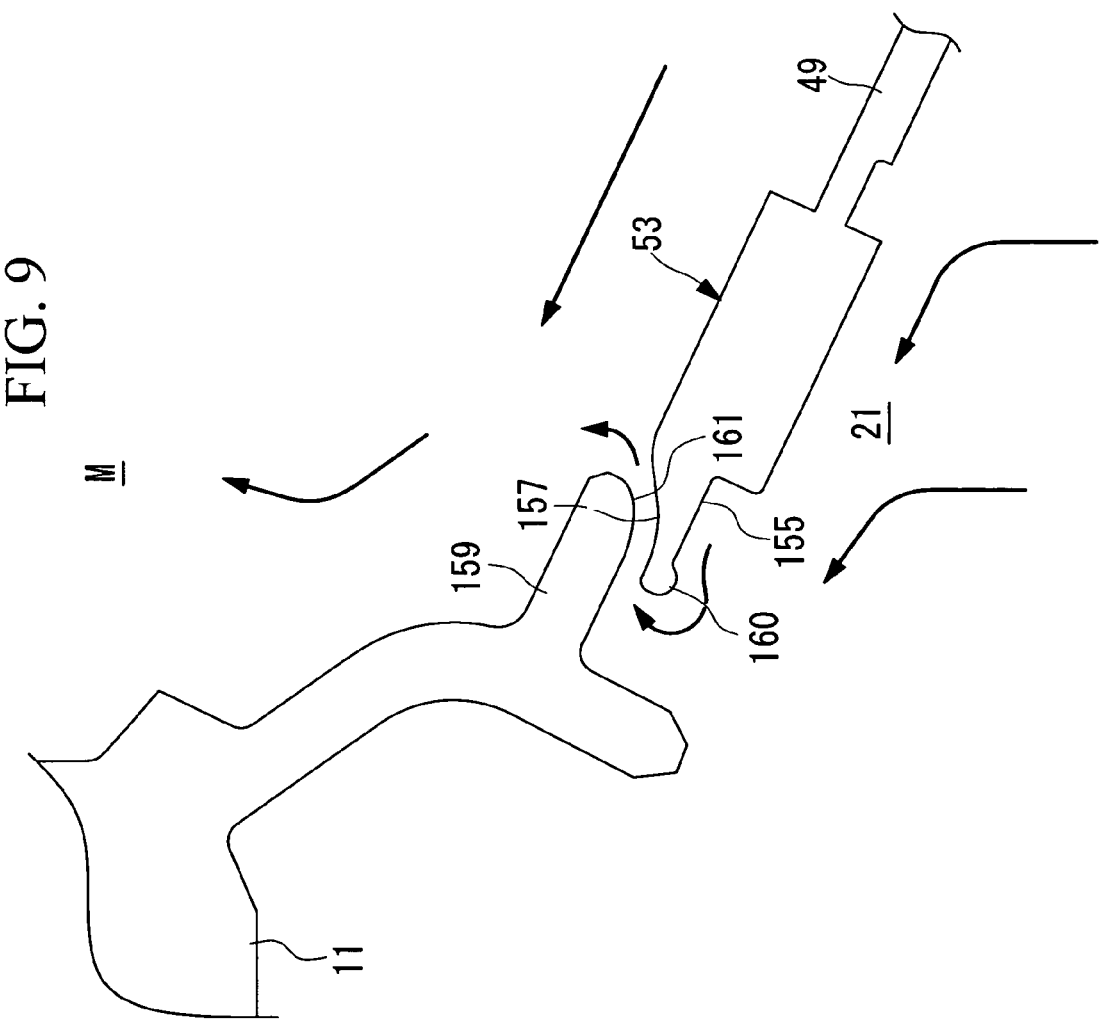

NOISE SUPPRESSING DAMPER

TECHNICAL FIELD

The present invention relates to a damper, an air conditioning unit, and a vehicular air conditioning system.

BACKGROUND ART

Generally, a vehicular air conditioning system controls a flow direction of conditioned air through a flow passage inside the system, a flow rate of the conditioned air to supply the conditioned air at different temperatures to a plurality of regions of a vehicle interior such that the atmospheric temperatures of the respective regions may be individually controlled. The damper which is opened and closed to control the cross-section area of the flow passage has been employed for controlling the flow direction and the flow rate of the conditioned air.

Under the control of the flow direction or flow rate of the conditioned air using the damper as described above, it is well known that the abnormal noise (air noise or wind noise; hereinafter referred to as the air noise) is heard when the conditioned air passes the region with the reduced cross-section area, that is, the small opening of the damper as described below. Various techniques have been proposed to prevent or suppress generation of the aforementioned air noise (for example, in Patent Documents 1 to 3).

Patent Document 1: Japanese Unexamined Patent Application, Publication No. 2006-69489
Patent Document 2: Japanese Unexamined Patent Application, Publication No. 2005-205990
Patent Document 3: Japanese Unexamined Patent Application, Publication No. 2006-182245

DISCLOSURE OF INVENTION

Each technique proposed in Patent Documents 1 to 3 is intended to suppress generation of the air noise by regulating the flow of the conditioned air which passes the region with the reduced cross-section area of the flow passage, or intentionally forming the perturbation of the flow. However, the proposed technique may fail to suppress generation of the air noise because of the complicated shape of the flow passage in the vehicular air conditioning system.

The air noise is likely to be caused by the influence of the shape of the flow passage upstream or downstream of the region where the cross-section area of the flow passage is reduced.

In consideration with the aforementioned disadvantage, it is an object of the present invention to provide the damper, the air conditioning unit, and the vehicular air conditioning system capable of suppressing the abnormal noise (air noise) at the small opening of the damper.

For the purpose of achieving the aforementioned object, the present invention provides means as described below.

A first aspect of the present invention provides a damper which includes a wall having its surface formed as a flow passage which allows an air to flow, a stationary portion which extends from the wall to a center of the flow passage, and a rotating portion rotatably disposed in the flow passage, having one end in contact with a portion of the stationary portion downstream of the air flowing through the flow passage. A convex curved wall portion protruding to the center of the flow passage is formed at a position of the surface of the wall on which the air which has passed between the one end and the stationary portion impinges.

According to the first aspect of the present invention, air which has passed between the one end and the stationary portion which get close with each other impinges on the curved wall portion to flow therealong. As the curved wall portion is formed to have a convex curved surface protruding to the center of the flow passage, the flow rate of air flowing along the curved wall portion is increased, and the pressure rise in the region around the curved wall portion is reduced. In this case, the pressure fluctuation in the region around the curved wall portion due to the vortices and the jet flow of air passing between the one end and the stationary portion generally becomes less than the case provided with no curved wall portion. This may suppress the level of the air noise caused by the pressure fluctuation.

In the first aspect of the present invention, preferably a protrusion protruding to a downstream of the air flowing through the flow passage is formed at a position of the stationary portion in contact with the one end.

When the one end gets close to the stationary portion, the narrowed portion of the flow passage with minimum cross-section area is formed therebetween, and the cross-section area of the region of the flow passage downstream of the protrusion becomes large. Accordingly, the maximum flow velocity of air after passing between the one end and the protrusion may be reduced compared with the case provided with no protrusion, thus reducing the level of the generated air noise.

In the aforementioned structure, preferably the protrusion includes a protrusion expanded portion as a convex curve on a surface of the stationary portion at a proximal end where the protrusion is formed.

In the structure, when air which has passed between the one end getting close to the stationary portion flows along the protrusion expanded portion as a convex curve protrusion. Air flows to be dispersed through the flow passage which expands at the portion downstream of the protrusion rapidly compared with the structure provided with no protrusion expanded portion. The maximum flow velocity of air may be reduced quickly to make sure that the level of the generated air noise is reduced.

A second aspect of the present invention provides a damper which includes a stationary portion which extends from a wall surface for forming an air flow passage to a center of the flow passage, and a rotating portion rotatably disposed in the flow passage, having one end in contact with a portion of the stationary portion upstream of an air flow through the flow passage. A contact portion as an inclined surface having a thickness of the one end reduced to a leading end is formed at a position of the one end at least in contact with the stationary portion.

According to the second aspect of the present invention, when the one end gets close to the stationary portion, air from the region around the center of the flow passage flows along the rotating portion to reach the one end to pass between the one end and the stationary portion. Compared with the structure provided with no contact portion as the inclined surface, the air which has reached the one end flows along the contact portion and the air is accelerated between the one end and the stationary portion. This makes it possible to suppress the level of the air noise caused by the fluctuation in the air flow velocity.

As air which has reached the one end may be prevented from deviating from the contact portion, the effective cross-section area of the flow passage between the one end and the stationary portion is maintained in the stable state. This may reduce the flow velocity of air passing between the one end and the stationary portion stably so as to suppress the level of the air noise caused by the fluctuation in the air flow velocity.

As air which has passed between the one end and the stationary portion is allowed to flow along the contact portion as the inclined surface, it may be led toward downstream of the flow passage without causing impingement on the other wall portion. This makes it possible to prevent generation of the air noise due to the pressure fluctuation caused by the impingement of the air flow on the wall.

A third aspect of the present invention provides a damper which includes a stationary portion which extends from a wall surface for forming an air flow passage to a center of the flow passage, and a rotating portion rotatably disposed in the flow passage, having one end in contact with a portion of the stationary portion upstream of an air flow through the flow passage. An end of a side surface opposite the upstream side of the one end includes a side expanded portion as a convex curved surface protruding to the upstream side when the one end gets close to the stationary portion.

In the third aspect, when the one end gets close to the stationary portion, air from the region around the center of the flow passage flows along the rotating portion to reach the one end so as to pass between the one end and the stationary portion. Air flows along the side expanded portion to reach the one end, and passes between the one end and the stationary portion along the wall surface of the one end. As air which has reached the one end flows along the side expanded portion and the one end to form the stable accelerated flow between the one end and the stationary portion compared with the case provided with no side expanded portion. This makes it possible to suppress the level of the air noise caused by the fluctuation in the air flow velocity.

Separation of the air flow from the one end may be suppressed so as to ensure the effective cross-section area of the flow passage between the one end and the stationary portion in the stable state. The flow velocity of air passing between the one end and the stationary portion may be reduced in the stable state so as to suppress the level of the air noise caused by the fluctuation in the air flow velocity.

In the third embodiment, preferably the side surface of the one end opposite the stationary portion includes a contact portion as an inclined surface having a thickness of the one end reduced to a leading end.

In the aforementioned structure, when the one end gets close to the stationary portion, air which has reached the one end flows along the contact portion to form the stable accelerated flow between the one end and the stationary portion. This makes it possible to suppress the level of the air noise caused by the fluctuation in the air flow velocity.

Separation of the air which has reached the one end may be suppressed from the contact portion so as to ensure the effective cross-section area of the flow passage between the one end and the stationary portion in the stable state. The flow velocity of air passing between the one end and the stationary portion may be decreased in the stable state so as to suppress the level of the air noise caused by the fluctuation in the air flow velocity.

As air which has passed between the one end and the stationary portion is allowed to flow along the contact portion as the inclined surface, such air may be led to the downstream of the flow passage without causing the air impingement on the other wall portion. This makes it possible to prevent generation of the air noise due to the pressure fluctuation caused by the air impingement on the wall.

In the third embodiment, preferably a side surface of the stationary portion opposite the rotating portion includes a stationary expanded portion as a convex curved surface protruding to the rotating portion.

In the aforementioned structure, when one end gets close to the stationary portion, the air which has passed therebetween flows along the stationary expanded portion. This makes it possible to prevent the air flow from separating from the stationary portion, thus preventing the air noise caused by the separation.

The structure allows the cross-section area of the flow passage formed with the one end to be continuously changed to make the fluctuation in the flow velocity of the passing air reduced, resulting in the stable flow. This makes it possible to suppress the level of the air noise caused by the fluctuation in the air flow velocity.

A fourth aspect of the present invention provides an air conditioning unit provided with the damper according to any one of the first to the third aspects.

In the fourth aspect of the present invention, the damper according to any one of the first to the third aspects is provided to suppress the air noise generated at the small opening of the damper.

A fifth aspect of the present invention provides a vehicular air conditioning system provided with the air conditioning unit according to the fourth aspect.

In the fifth aspect of the present invention, the air conditioning unit according to the fourth aspect of the present invention is provided to suppress the air noise generated at the small opening of the damper.

In the vehicular air conditioning system according to the fifth aspect, which is provided with the damper according to any one of the first to the third aspect, and the air conditioning unit according to the fourth aspect, the fluctuation in the pressure at the region around the curved wall portion due to the vortices generated in the passage of air between one end and the stationary portion may be suppressed to be relatively low. This makes it possible to suppress the air noise generated at the small opening of the damper.

In the vehicular air conditioning system according to the fifth aspect, which is provided with the damper according to any one of the first to the third aspect, and the air conditioning unit according to the fourth aspect, the contact portion is formed as the inclined surface. This makes it possible to form the stable accelerated air flow between the one end and the stationary portion, and to suppress the air noise generated at the small opening of the damper.

In the vehicular air conditioning system according to the fifth aspect, which is provided with the damper according to any one of the first to the third aspect, and the air conditioning unit according to the fourth aspect, the side expanded portion is formed as the protruding convex curve surface. This makes it possible to form the stable accelerated air flow between the one end and the stationary portion, and to suppress the air noise generated at the small opening of the damper.

BRIEF DESCRIPTION OF DRAWINGS

FIG. 9 is a sectional view partially representing the positional relationship between the leading end and the air-mix rib portion as shown in FIG. 8.

EXPLANATION OF REFERENCE SIGNS

Figure 1:
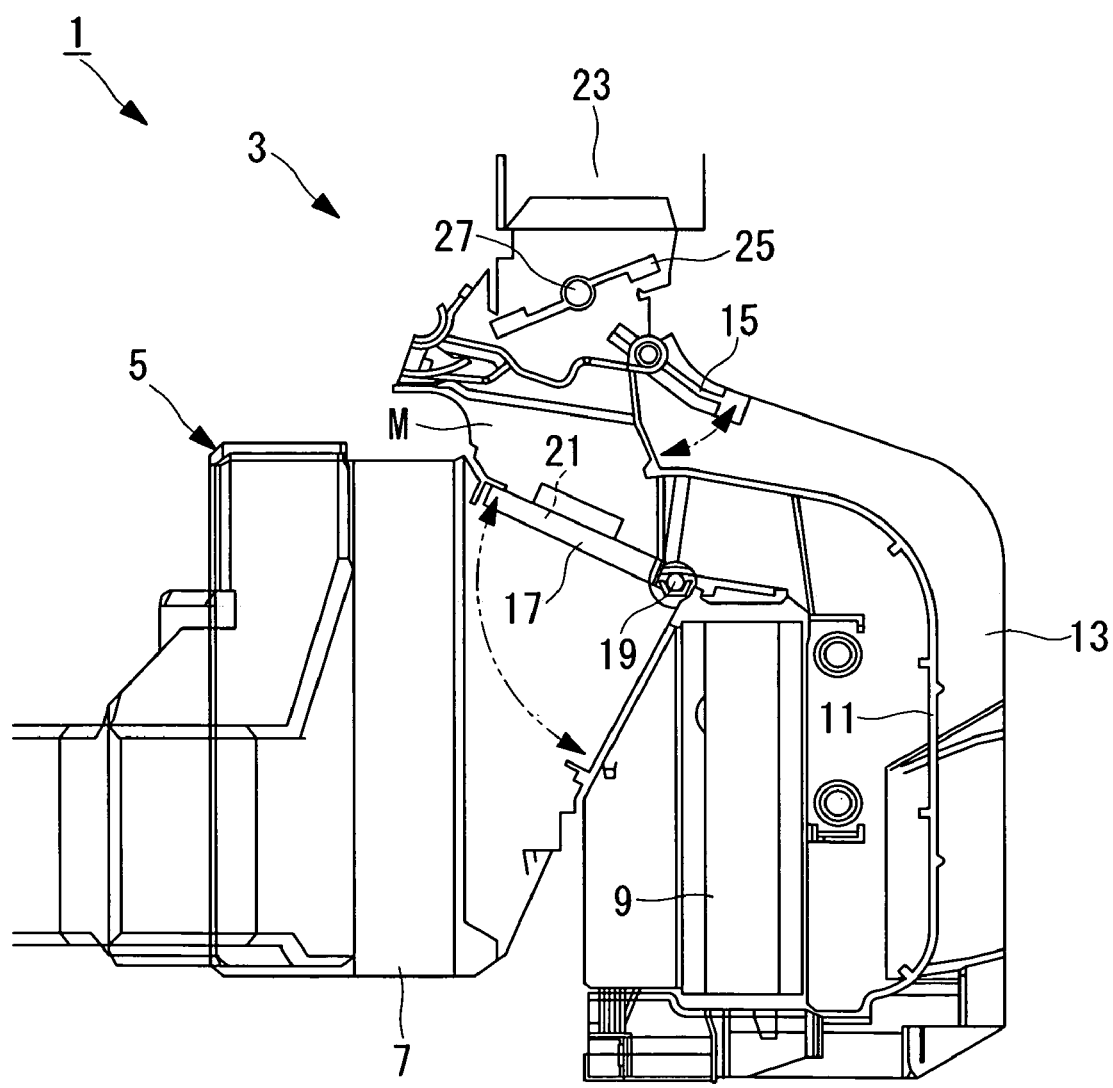
FIG. 1 is a sectional view illustrating the outline structure of an HVAC unit in the vehicular air conditioning system according to a first embodiment of the present invention.

1: vehicular air conditioning system
2: HVAC unit (air conditioning unit)
17: air-mix damper (rotating portion)
21: cool air bypass flow passage (flow passage)
23: conditioned air flow passage (flow passage)
25: mode damper (rotating portion)
29: first mode plate (one end)
33: wall surface
35: first mode rib portion (stationary portion)
41: rib protrusion (protrusion)
43: protrusion expanded portion
45: curved wall portion
49: first air-mix plate (rotating portion)
55, 155: leading end (one end)
57, 157: contact portion
59, 159: air-mix rib portion (stationary portion)
160: side expanded portion
161: rib expanded portion (stationary expanded portion)

BEST MODE FOR CARRYING OUT THE INVENTION

First Embodiment

A vehicular air conditioning system according to a first embodiment of the present invention will be described referring to FIGS. 1 to 7.

FIG. 1 is a sectional view illustrating an outline structure of an HVAC unit of the vehicular air conditioning system according to the embodiment.

The HVAC (Heating, Ventilation, and Air-Conditioning) unit (air conditioning unit) 3 in the vehicular air conditioning system 1 includes a casing 5, an evaporator 7, and a heater core 9 as shown in FIG. 1.

The vehicular air conditioning system 1 supplies conditioned air to the vehicle interior for heating and dehumidification to make the interior environment comfortable. The vehicular air conditioning system 1 includes a closed circuit refrigerating cycle formed by connecting a compressor (not shown) operated by a part of the output of the internal combustion engine for the vehicle, a condenser (not shown) for condensing the gas refrigerant through heat exchange with the outdoor air, an expansion valve (not shown) for reducing the pressure of the liquid refrigerant, and an evaporator 7 for vaporizing the liquid refrigerant through the heat exchange with the introduced air via the refrigerant pipes. The evaporator 7 has the function in draining the introduced air of the vaporization heat so as to cool and dehumidify the introduced air as cooling means together with the heater core 9 as the heat source for the normal heating in the HVAC unit 3.

The casing 5 stores the evaporator 7 and the heater core 9 therein as shown in FIG. 1. The evaporator 7 is disposed at an inlet of air flow (left in FIG. 1), and the heater core 9 is disposed downstream of the evaporator 7 (right in FIG. 1).

An air passage partition 11 is disposed in the casing 5 at the position opposite the air blow surface of the heater core 9 at a predetermined interval therefrom. The air passage partition 11 extends from the lower end support surface of the heater core 9 upward substantially in parallel therewith to the region around the mix region M. The upper end of the air passage partition 11 is curved to be directed to the evaporator 7.

A warm air flow passage 13 through which warm air flows from the mix region M downstream of the evaporator 7 above the heater core 9 is formed between the back surface of the air passage partition 11 with respect to the heater core 9 (right in FIG. 1) and the casing 5. The warm air flow passage 13 is connected to a foot air outlet (not shown) through which the warm air is fed to the floor of the vehicle interior. A switching damper 15 for controlling the inflow of the warm air to the warm air flow passage 13 is disposed in an opening communicated with the mix region M.

The mix region M is the space for forming the conditioned air at the desired temperature by mixing the cool air cooled by the evaporator 7 with the warm air heated by the heater core 9.

An air-mix damper (rotating member) 17 for selectively switching the passage of air which has passed the evaporator 7 is disposed between the evaporator 7 and the heater core 9. The air-mix damper 17 is provided to be rotatable with an air-mix shaft 19 as a support point.

A cool air bypass flow passage (flow passage) 21 for directly introducing air which has passed the evaporator 7 to the mix region M is formed at the upper portion of the space defined by the evaporator 7 and the heater core 9.

In the maximum heating state, the air-mix damper 17 turns upward to fully close the cool air bypass flow passage 21 such that the whole amount of air which has passed the evaporator 7 is led to the heater core 9. Meanwhile, in the maximum cooling state, the air-mix damper 17 turns downward to fully open the cool air bypass flow passage 21 such that the whole amount of air which has passed the evaporator 7 is led to the mix region M. The air-mix damper 17 is controlled to be operated to the arbitrary position between the fully closed state and the fully opened state as described above depending on the temperature of the conditioned air mixed in the mix region M.

A conditioned air flow passage (flow passage) 23 is formed above the mix region M, through which the conditioned air at the temperature adjusted in the mix region M flows. The conditioned air flow passage 23 is connected to a vent hole (not shown) for blowing the conditioned air into the vehicle interior.

A mode damper (rotating portion) 25 rotatable with a mode shaft 27 as the support point is disposed between the mix region M and the conditioned air flow passage 23.

The mode damper 25 is rotatable between the position to fully close the conditioned air flow passage 23 and the position to fully open the conditioned air flow passage 23. The flow rate of the conditioned air flowing into the conditioned air flow passage 23 may be controlled based on the position of the mode damper 25.

The air-mix damper 17 and the mode damper 25, and the peripheral elements thereof as the features of the embodiment will be described.

Figure 2:
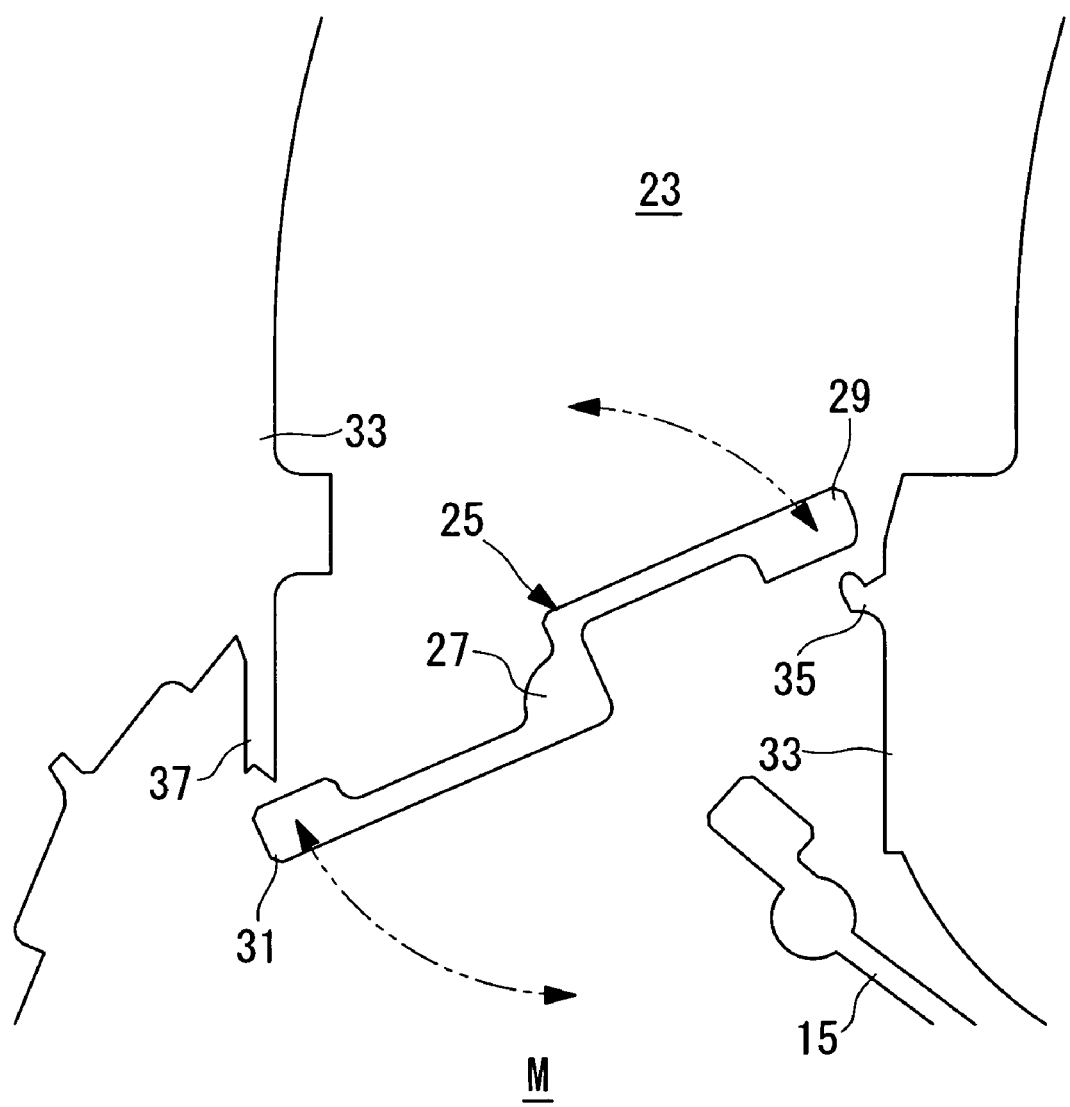
FIG. 2 is a view illustrating the mode damper and a peripheral structure shown in FIG. 1.

FIG. 2 is a view illustrating the mode damper and the peripheral elements thereof as shown in FIG. 1.

The mode damper 25 includes a mode shaft 27 disposed at substantially the center of the conditioned air flow passage 23, a first mode plate (one end) 29 which extends from the mode shaft 27 to the downstream side of the conditioned air flow passage 23, and a second mode plate 31 which extends to the upstream side. A first mode rib portion (stationary portion) 35 extending toward the mode shaft 27, and a second mode rib portion 37 extending toward the upstream side of the conditioned air flow passage 23 are formed on the respective wall surfaces 33 which form the conditioned air flow passage 23.

Figure 3:
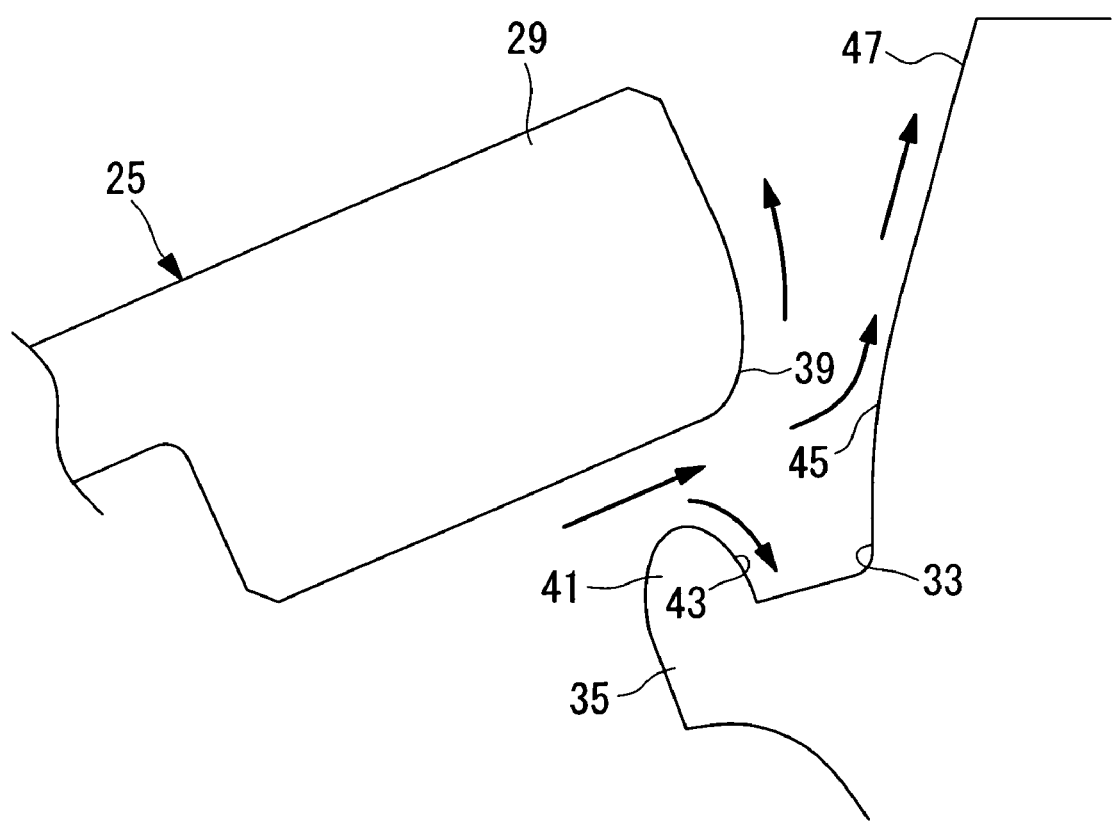
FIG. 3 is a view illustrating the end portion at the downstream side of the mode damper and the peripheral structure shown in FIG. 2.

FIG. 3 is a view illustrating the end portion of the mode damper at the downstream side and the peripheral structure as shown in FIG. 2.

Referring to FIG. 3, the first mode plate 29 includes a curved portion 39 for smoothly connecting the end surface to the surface of the first mode plate 29 in contact with the first mode rib portion 35.

A rib protrusion (protrusion) 41 which protrudes to the downstream side of the conditioned air flow passage 23 and extends along the mode shaft 27 (in the vertical direction in FIG. 3) is formed as the end of the first mode rib portion 35. The rib protrusion 41 is shaped to have the cross-section area reduced to the downstream side, and includes a protrusion expanded portion 43 with a convex curved surface protruding from the surface of the first mode rib portion 35 at the side where the rib protrusion 41 is formed.

A convex curved wall portion 45 is formed to protrude to the center of the conditioned air flow passage 23 on the wall surface 33 downstream of the first mode rib portion 35. An inclined wall 47 serving to expand the cross-section area of the conditioned air flow passage 23 to the downstream side is formed downstream of the bent wall portion 45. In other words, the inclined wall 47 for expanding the cross-section area of the conditioned air flow passage 23 to the downstream side, and the curved wall portion 45 for smoothly connecting the wall surface 33 on which the first mode rib portion 35 is formed to the inclined wall 47 are formed on the wall surface 33 downstream of the first mode rib portion 35.

The generated structure makes it possible to easily form the wall surface 33 including the curved wall portion 45 and the inclined wall 47 formed thereon using the mold without the slide pins.

Figure 4:
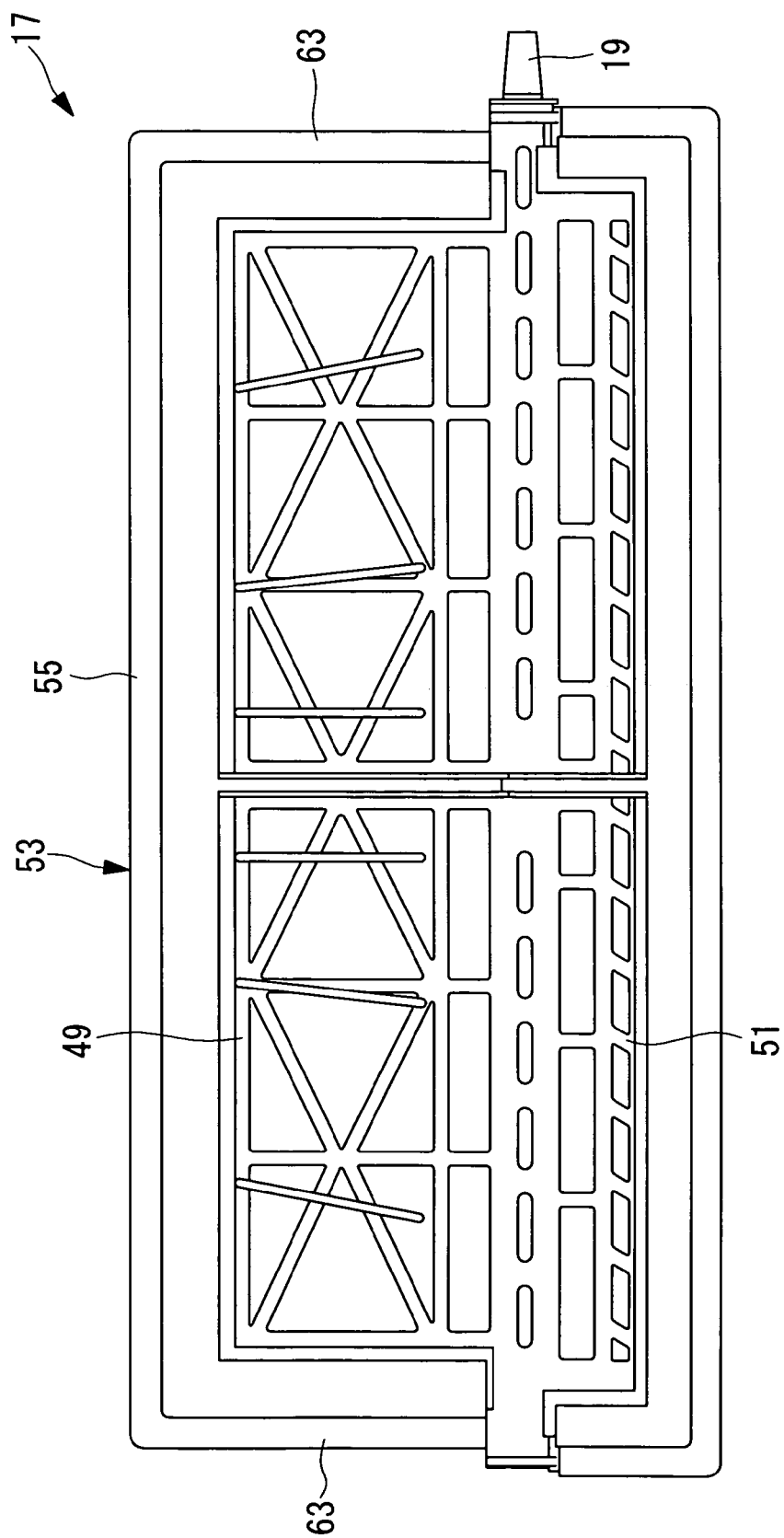
FIG. 4 is a view showing an outline structure of the air-mix damper shown in FIG. 1.

FIG. 4 is a view showing the outline structure of the air-mix damper shown in FIG. 1.

Figure 6:
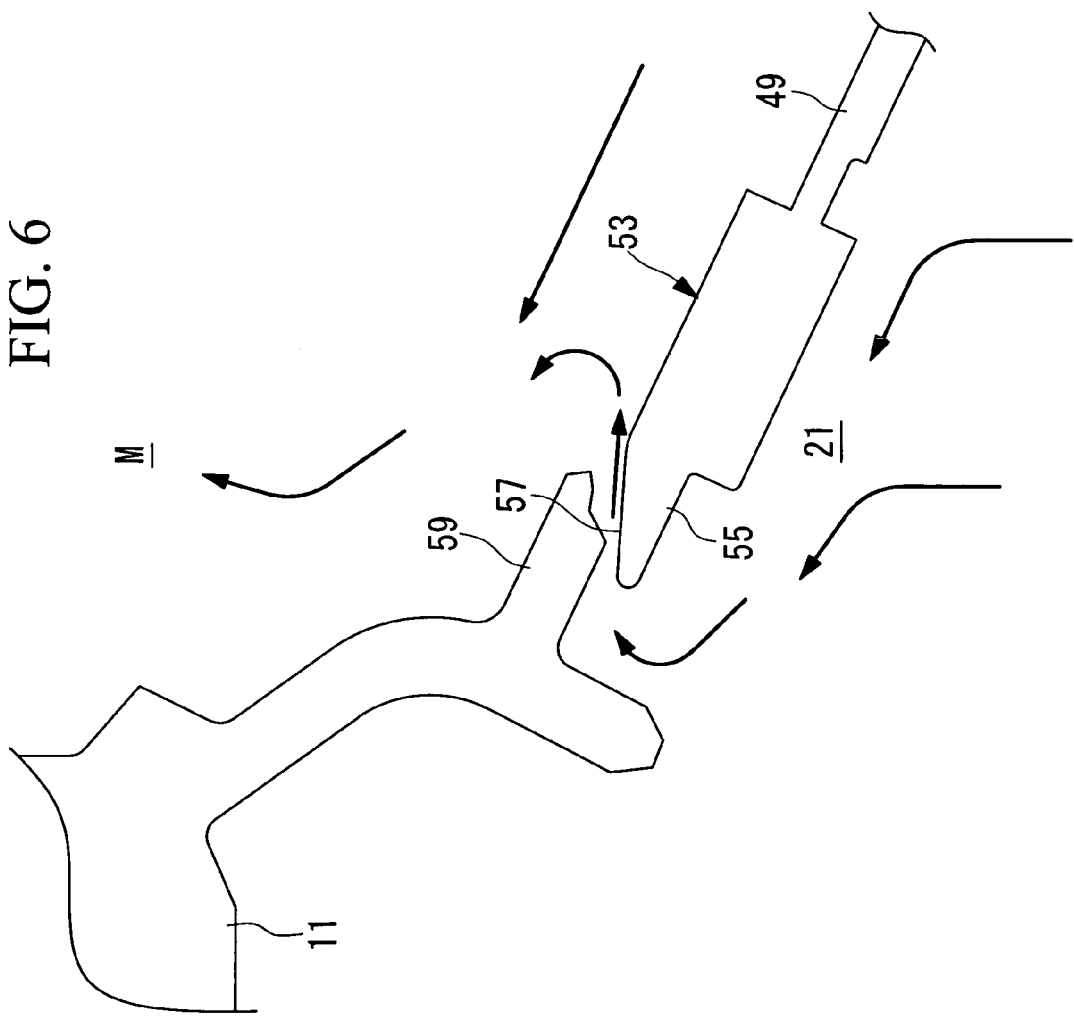
FIG. 6 is a partially enlarged sectional view showing the structure of an essential portion and the peripheral structure of the air-mix damper as shown in FIG. 1.

Referring to FIGS. 1 and 6, the air-mix damper 17 includes an air-mix shaft 19, a first air-mix plate (rotating portion) 49 extending from the air-mix shaft 19 to the evaporator 7, and a second air-mix plate 51 extending to the heater core 9.

An edge member 53 formed of an elastic material such as the urethane rubber covers three sides of the first air-mix plate 49.

Figure 5:
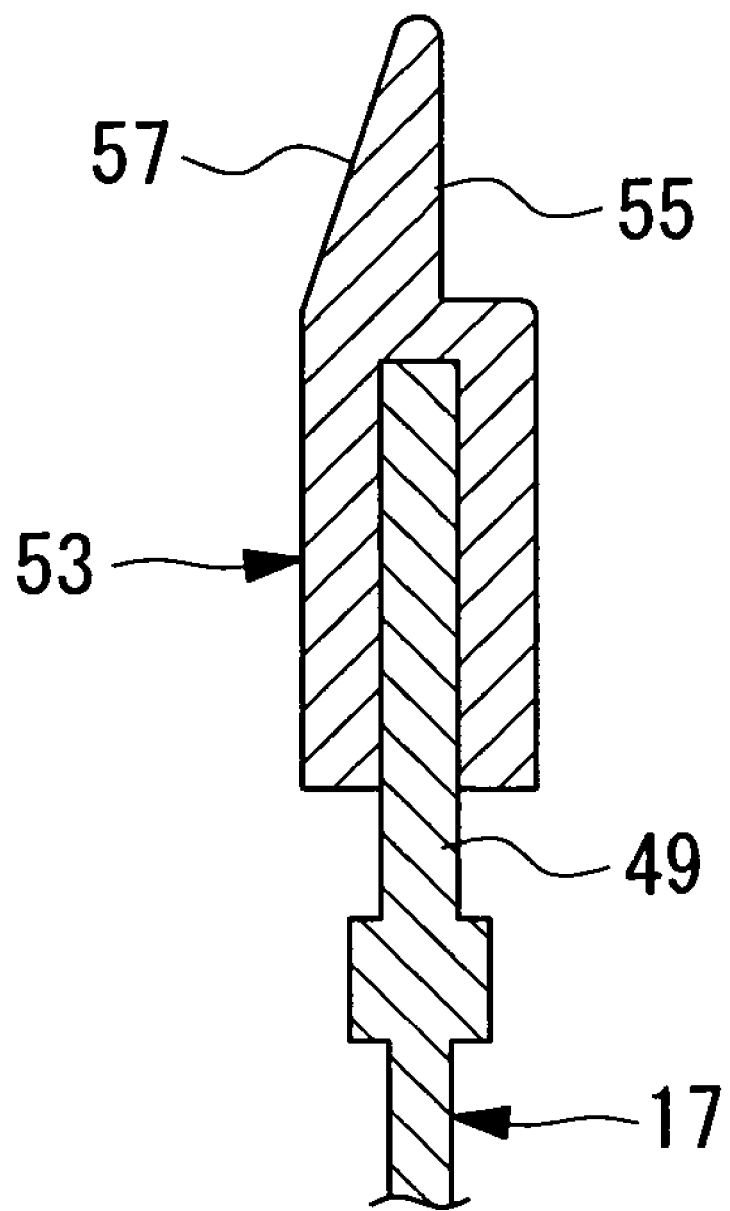
FIG. 5 is a partially enlarged sectional view showing the structure of an essential portion of the air-mix damper as shown in FIG. 4.

FIG. 5 is a partially enlarged sectional view showing the structure of the essential portion of the air mix damper shown in FIG. 4. FIG. 6 is a partially enlarged sectional view illustrating the essential portion of the air-mix damper and the peripheral structure as shown in FIG. 1.

A leading end (one end) 55 of the edge member 53 extending in parallel with the air-mix shaft 19 includes a contact portion 57 having its thickness reduced toward the tip end as shown in FIGS. 5 and 6. The contact portion 57 is formed on the surface of the leading end 55 in contact with the air-mix rib portion (stationary portion) 59 extending from the casing 5.

Figure 7:
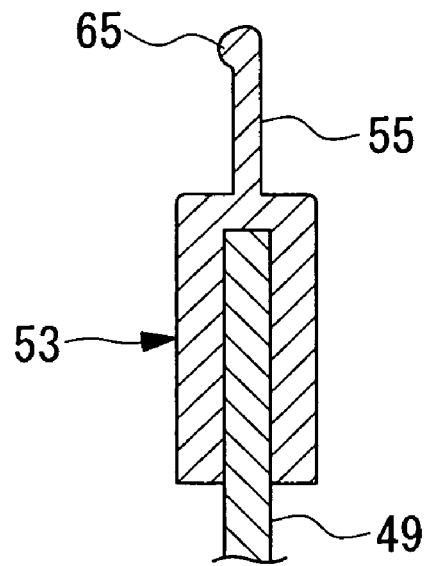
FIG. 7 is a partially enlarged sectional view showing the structure of the other essential portion in the air-mix damper shown in FIG. 4.

FIG. 7 is a partially enlarged sectional view showing the structure of the other essential portion of the air-mix damper shown in FIG. 4.

A side edge 63 of the edge member 53 extending in the direction intersecting with the air-mix shaft 19 includes a damper protrusion 65 as a substantially half-column shape to protrude to the air-mix rib portion 59 (leftward in FIG. 7).

The side edge 63 includes only the damper protrusion 65 to maintain the side edge 63 thin enough to ensure flexibility. The side edge 63 contacts with the air-mix rib portion 59 from the portion closer to the air-mix shaft 19 when closing the air-mix damper 17. The side edge 63 with sufficient elasticity is easily deformed accompanied with the rotation of the air-mix damper 17 without interfering with its rotating operation. This makes it possible to prevent generation of the gap while keeping the contact state between the damper protrusion 65 and the air-mix rib portion 59.

The respective air flows at the small opening of the air-mix damper and the mode damper in the vehicular air conditioning system 1 will be described.

The air flow passing the air-mix damper will be described.

Referring to FIG. 6, in the case where the edge member 53 of the air-mix damper 17 gets close to the air-mix rib portion 59 to reduce the opening of the air-mix damper 17, air which has passed the evaporator 7 partially flows into the mix region M through the cool air bypass flow passage 21 having the cross-section area reduced by the air-mix damper 17 and the air-mix rib portion 59 (see FIG. 1).

The passing air then reaches the leading end 55 from the edge member 53 at the side of the air-mix shaft 19 to pass between the leading end 55 and the air-mix rib portion 59.

The air which has reached the leading end 55 to flow between the leading end 55 and the air-mix rib portion 59 further flows along the contact portion 57.

The air flowing along the contact portion 57 enters into the mix region M where it is mixed with the air heated through the heater core 9.

The air flow passing the mode damper 25 will be described.

Referring to FIG. 3, when the first mode plate 29 gets close to the first mode rib portion 35, the second mode plate 31 also gets close to the second mode rib portion 37 as shown in FIG. 2 to reduce the opening of the mode damper 25. Then the cross-section area of the conditioned air flow passage 23 is reduced. At least a portion of the conditioned air mixed in the mix region M passes the conditioned air flow passage 23 having the cross-section area reduced by the mode damper 25 so as to be blown from the vent hole.

The conditioned air flowing from the mix region M to the mode damper 25 flows along the first mode plate 29 to pass between the first mode plate 29 and the first mode rib portion 35 as shown in FIG. 2.

Referring to FIG. 3, the conditioned air is accelerated through the conditioned air flow passage 23 with the cross-section area reduced by the first mode plate 29 and the rib protrusion 41. The conditioned air which has passed the region around the rib protrusion 41 is decelerated along the protrusion expanded portion 43 due to the increased cross-section area of the flow passage.

The conditioned air which has passed between the first mode plate 29 and the rib protrusion 41 flows straight to impinge on the curved wall portion 45. The conditioned air impinged on the wall portion 45 is partially accelerated along the curved wall portion 45, and further flows to the downstream side (upward in FIG. 3). The conditioned air which has flown along the curved wall portion 45 further flows along the inclined surface 47 so as to be blown from the vent hole (not shown) through the conditioned air flow passage 23.

Meanwhile, the conditioned air around the first mode plate 29 flows from its surface opposite the first mode rib portion 35 along the curved surface 39, and is led to the downstream side of the conditioned air flow passage 23 (upward in FIG. 3).

This makes it possible to prevent reduction in the effective cross-section area of the flow passage for the conditioned air which has passed between the first mode plate 29 and the first mode rib portion 35, thus decreasing the flow velocity of the conditioned air.

In the aforementioned structure, when the first mode plate 29 gets close to the first mode rib portion 35, the conditioned air which has passed therebetween impinges on the curved wall portion 45 to flow therealong. As the curved wall portion 45 is convex curved protruding to the center of the conditioned air flow passage 23, the conditioned air is partially accelerated along the curved wall portion 45, thus suppressing the pressure rise at the region around the curved wall portion 45. The fluctuation in the pressure at the region around the curved wall portion 45 caused by the vortices and jet flow generated upon passage of the conditioned air between the, first mode plate 29 and the first mode rib portion 35 becomes less as a whole compared with the case provided with no curved wall portion 45. This makes it possible to suppress the level of the air noise caused by the pressure fluctuation.

The rib protrusion 41 serves to expand the effective cross-section area of the flow passage for the conditioned air at the downstream side of the rib protrusion 41. Unlike the case provided with no rib protrusion 41, the maximum flow velocity of the conditioned air after passing between the first mode plate 29 and the rib protrusion 41 may be reduced, thus suppressing the level of the generated air noise.

The conditioned air which has flown between the first mode plate 29 and the rib protrusion 41 flows along the convex curved protrusion expanded portion 43. Compared with the case provided with no protrusion expanded portion 43, the conditioned air is allowed to easily flow along the flow passage expanding at the downstream side of the rib protrusion 41. This makes it possible to reduce the maximum flow velocity of the conditioned air, thus ensuring to suppress the level of the generated air noise.

When the leading end 55 gets close to the air-mix rib portion 59, the air that has passed the region around the center of the cool air bypass flow passage 21 flows along the first air-mix plate 49 to reach the leading end 55, and passes between the leading end 55 and the air-mix rib portion 59. Compared with the case provided with no contact portion 57 as the inclined surface, the air which has reached the leading end 55 flows along the contact portion 57 to form the accelerated air flow between the leading end 55 and the air-mix rib portion 59 as well as the stable air flow along the wall surface. This makes it possible to suppress the level of the air noise caused by the fluctuation in the air flow velocity.

As the structure is capable of suppressing separation of the air which has reached the leading end 55 from the contact portion 57, the effective cross-section area of the flow passage between the leading end 55 and the air-mix rib portion 59 may be maintained in the stable state. This makes it possible to stably reduce the flow velocity of air passing between the leading end 55 and the air-mix rib portion 59, and suppress the level of the air noise caused by the fluctuation in the air flow velocity.

As the air which has passed between the leading end 55 and the air-mix rib portion 59 is allowed to flow along the contact portion 57 as the inclined surface, such air may be led into the mix region M without causing the impingement on the other wall portion. This makes it possible to prevent generation of the air noise due to the pressure fluctuation resulting from the impingement of the air flow on the wall.

Second Embodiment

A second embodiment according to the present invention will be described referring to FIGS. 8 and 9.

The basic structure of the vehicular air conditioning system of the embodiment is substantially the same as that of the first embodiment except the structure of the leading end of the air-mix damper. Accordingly, the structure of the leading end of the air-mix damper will only be described referring to FIGS. 8 and 9, and the explanation of the other elements will be omitted.

Figure 8:
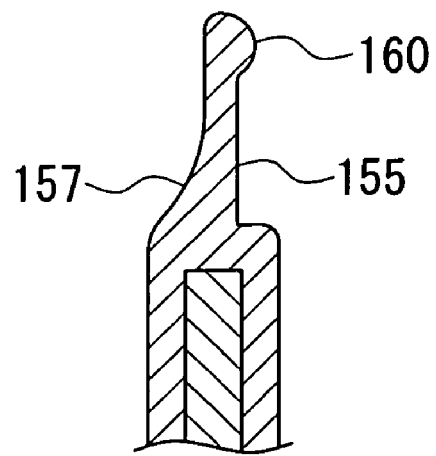
FIG. 8 is a sectional view-partially showing the structure of a leading end of the air-mix damper according to a second embodiment of the present invention.

FIG. 8 is a sectional view partially showing the structure of the leading end of the air-mix damper in the embodiment. FIG. 9 is a sectional view partially representing the positional relationship between the leading end shown in FIG. 8 and the air-mix rib portion.

The same elements as those in the first embodiment will be designated with the same reference numerals, and explanations thereof, thus will be omitted.

A leading end (one end) 155 of the edge member 53 of the air-mix damper 17 includes a contact portion 157 as the inclined surface such that the thickness of the leading end 155 is reduced toward the end, which faces the air-mix rib portion 159, and a convex curved side expanded portion 160 protruding at the side surface opposite the contact portion 157 as shown in FIGS. 8 and 9.

The contact portion 157 is curved as the concave shape conforming to the convex curved surface of the rib expanded portion 161 of the air-mix rib portion 159.

The side expanded portion 160 is formed to extend along the air-mix shaft 19 (substantially vertical direction in FIG. 8).

Referring to FIG. 9, the air-mix rib portion (stationary portion) 159 includes a rib expanded portion (stationary expanded portion) 161 as a convex curved protrusion on the surface opposite the leading end 155.

Then the air flow at the small opening of the air-mix damper in the above-structured vehicular air conditioning system 1 will be described.

Referring to FIG. 9, when the edge member 53 of the air-mix damper 17 gets close to the air-mix rib portion 159 to reduce the opening of the air-mix damper 17, the air which has passed the evaporator 7 partially passes the cool air bypass flow passage 21 having the cross-section area reduced by the air-mix damper 17 and the air-mix rib portion 159 and further flows into the mix region M (see FIG. 1).

The air then reaches the leading end 155 from the edge member 53 at the side of the air-mix shaft 19 (right in FIG. 9) to pass between the leading end 155 and the air-mix rib portion 159. When reaching the leading end 155, the air flows along the side expanded portion 160, and further flows between the leading end 155 and the air-mix rib portion 159 from the side expanded portion 160 directly along the contact portion 157.

The air flowing between the leading end 155 and the air-mix rib portion 159 flows along the contact portion 157 and the rib expanded portion 161, and further flows into the mix region M where it is mixed with the air heated through the heater core 9.

In the aforementioned structure, when the leading end 155 gets close to the air-mix rib portion 159, the air which has passed the region around the center of the cool air bypass flow passage 21 flows along the first air-mix plate 49 to reach the leading end 155. It then flows between the leading end 155 and the air-mix rib portion 159. When reaching the leading end 155, the air flows along the rib expanded portion 161 to pass between the leading end 155 and the air-mix rib portion 159 along the leading end 155. Compared with the case provided with no rib expanded portion 161, the air which has reached the leading end 155 flows along the rib expanded portion 161 and the leading end 155. This makes it possible to allow the air to be accelerated between the leading end 155 and the air-mix rib portion 159 in the stable state with less flow separation area. This makes it possible to suppress the level of the air noise caused by the fluctuation in the air flow velocity.

As the separation of the air flow from the leading end 155 may be suppressed, the effective cross-section area of the flow passage between the leading end 155 and the air-mix rib portion 159 may be ensured in the stable state. This makes it possible to reduce the flow velocity of the air passing between the leading end 155 and the air-mix rib portion 159 in the stable state, thus suppressing the level of the air noise caused by the fluctuation in the air flow velocity.

As the air which has reached the leading end 155 flows along the contact portion 157, the air is allowed to be accelerated between the leading end 155 and the air-mix rib portion 159 in the stable state. This makes it possible to suppress the level of the air noise caused by the fluctuation in the air flow velocity.

The structure suppresses the separation of the air which has reached the leading end 155 from the contact portion 157 so as to ensure the effective cross-section area of the flow passage between the leading end 155 and the air-mix rib portion 159 in the stable state. This makes it possible to reduce the flow velocity of air passing between the leading end 155 and the air-mix rib portion 159 in the stable state as well as suppress the level of the air noise caused by the fluctuation in air flow velocity.

As the air which has passed between the leading end 155 and the air-mix rib portion 159 is allowed to flow along the contact portion 157 as the inclined surface, the air may be led into the mix region M without causing impingement on the other wall. This makes it possible to prevent generation of the air noise due to the pressure fluctuation.

The air which has passed between the leading end 155 and the air-mix rib portion 159 flows along the rib expanded portion 161. This may prevent separation of the air flow from the air-mix rib portion 159 as well as prevent generation of the air noise due to the separation.

The cross-section area of the flow passage defined by the leading end 155 may be sequentially changed to realize the small fluctuation in the flow velocity of the passing air, resulting in the stable flow. This makes it possible to suppress the level of the air noise caused by the fluctuation in the air flow velocity.

The invention claimed is:

1. A damper system comprising an airflow passage and a rotating portion:
    the rotating portion rotatably disposed within the airflow passage about a longitudinal axis, the rotating portion comprising a distal end defined as the end of the rotating portion that is downstream of a plane formed by the longitudinal axis and a transverse cross section of the airflow passage;
    the airflow passage comprising the space between a wall proximate the downstream end of the rotating portion in a closed and a second wall; the wall comprising:
        a rib extending from the wall toward the rotating portion longitudinal axis;
        a rib protrusion disposed on a downstream portion of the rib and spaced from the wall, the rib protrusion contacting the rotating portion downstream end when the damper system is in the closed position; and
    a protruding convex curved wall portion directly adjacent and downstream of the rib that does not contact the rotating portion downstream end when the damper system is in the closed position, wherein the flow rate of the air flowing along the protruding convex curved wall portion is increased, and
    the pressure rise in the region around the protruding convex curved wall portion is reduced.

2. The damper system according to claim 1, wherein the rib protrusion includes a protrusion expanded portion as a convex curve on a surface at a proximal end where the protrusion is formed.

3. A damper system comprising:
    an airflow passage defined in part by a wall and a rotating portion;
    the rotating portion rotatably disposed within the airflow passage about a pivot axis, the rotating portion comprising a pivot end and a distal end opposite the pivot end proximate the wall; the distal end comprising:
        a leading surface on an upstream face the distal end; and
        a contact surface on a downstream face of the distal end, the contact surface having an inclined surface;
    the wall comprising a rib extending from the wall toward the rotating portion pivot end and contacting the inclined surface when the damper system is in a closed position, such that when the damper system is not in a closed position air travels first around the distal end and up the included surface such that the air travels from the thinnest portion of the distal end toward the thickest portion.

* * * * *